G. V. TWISS.
GRIPPING DEVICE FOR WIRES AND THE LIKE.
APPLICATION FILED OCT. 4, 1920.
1,365,357. Patented Jan. 11, 1921.
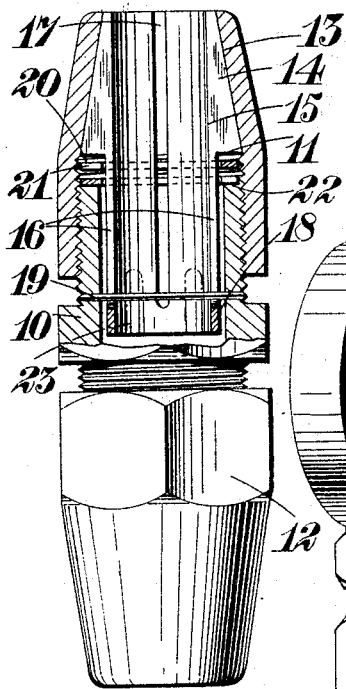
Fig.1.
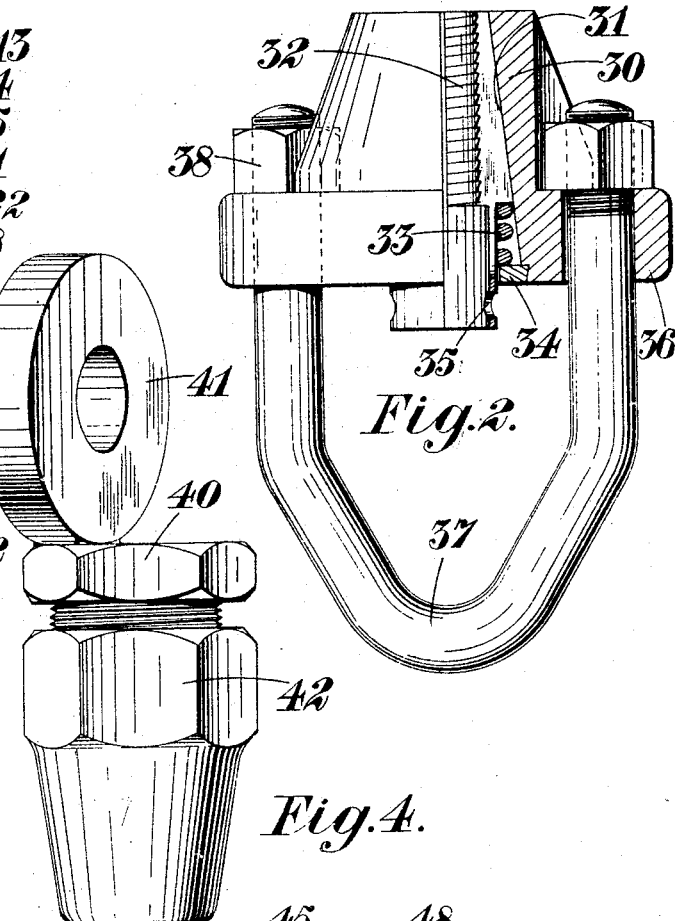
Fig.2.
Fig.4.
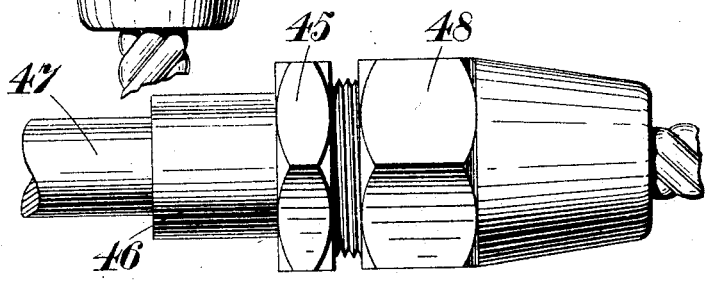
Fig.5.
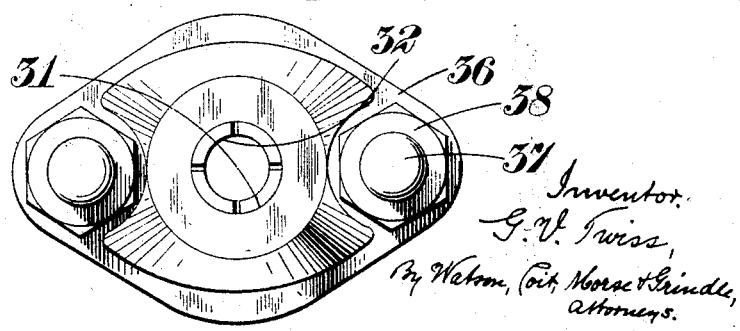
Fig.3.
Inventor.
G. V. Twiss,
By Watson, Coit, Morse & Grindle,
Attorneys.

UNITED STATES PATENT OFFICE.

GEORGE VICTOR TWISS, OF LONDON, ENGLAND.

GRIPPING DEVICE FOR WIRES AND THE LIKE.

1,365,357.   Specification of Letters Patent.   Patented Jan. 11, 1921.

Application filed October 4, 1920. Serial No. 414,695.

*To all whom it may concern:*

Be it known that I, GEORGE VICTOR TWISS, a subject of the King of England, residing in London, England, have invented certain new and useful Improvements in Gripping Devices for Wires and the like, of which the following is a specification.

This invention is for improvements in or relating to gripping devices for wires and the like, of the type comprising a plurality of gripping elements which are formed with internal gripping faces and are conical as to their external surface, to coöperate with an internally coned surrounding member; an endwise movement of the gripping elements relatively to the surrounding member or casing causes them to be closed together so as to grip a wire, rod, or the like inserted between. The internal gripping faces may be notched or serrated, but the general shaping of these surfaces is cylindrical.

There are two general types of this device, one in which the gripping elements are loose and entirely separate from one another, and the other in which the elements are connected together, and this invention provides an improved construction of the latter type. Various devices of this type are known; in one the elements are actually separate but are held together by a spring ring encircling them; in another the elements are constituted by a tube slit longitudinally, so that there are two elements joined together longitudinally; in others the elements are constituted by a tube conical externally and divided by saw-cuts extending from its smallest diameter through only a part of its length toward the larger diameter; and in other cases the coned elements are formed on the end of a tube which is divided by longitudinal cuts through the greater part of its length, these latter being used with yielding or contractible internal bushes which are interposed between the coned gripping elements and the part to be gripped. In this last-mentioned construction of gripping-device it has not heretofore been proposed to design the parts with any special or defined degree of flexibility in the material by which the gripping elements are connected together.

The object of this invention is to provide an improved construction of such device and the invention accordingly comprises a gripping device of the type above described wherein the elements which close together to effect the gripping are connected together by means which permit the gripping faces to move toward and away from one another, characterized by the said means being sufficiently flexible to permit the said gripping faces always to remain parallel with their original cylindrical setting when they are closed together by the wedging action obtained through their external conical surface.

According to another feature of the invention the gripping elements are virtually separate from one another but they are all connected to a single coaxial ring, which may itself be flexible, by strips which are flexible each in the radial plane wherein it lies.

In a preferred form, a gripping device according to this invention comprises the combination with an internally coned body of a tubular gripping element, conical externally as to a portion of its length, and having the thickness of its wall reduced as to the remainder, or a part thereof, of its length, and also being partially divided longitudinally as by saw-cuts, extending lengthwise through the conical portion into the said reduced walls.

According to another feature of the invention there is provided in a gripping device as above-described, the combination with the gripping elements, of a resilient control constantly urging the said elements into their gripping position, for the purpose hereinafter set forth.

In the accompanying drawings which illustrate various embodiments of this invention, Figure 1 is an elevation, partly in section, of a through connector;

Fig. 2 is a similar view showing the invention applied to a shackle connection;

Fig. 3 is a plan of Fig. 2, and

Figs. 4 and 5 show applications of this invention to electrical connections.

Referring first to the construction illustrated in Fig. 1, there is provided a body portion 10, hollow and externally screw-threaded at each end to receive upon it nut-like members 11, 12. These members are each provided with an internally-coned surface 13. Within the body 10 and nut 11 there is mounted a tubular gripping member. One end of this member 14 is conically formed as to its outer surface to coöperate with the coned surface 13 of the nut, and the inner surface 15 of this coned portion is serrated, notched or formed in any convenient manner to improve its gripping action upon any element such as a rod, wire or the like, inserted longitudinally into it.

The remainder of the length of this tubular gripping member, from the largest diameter of the coned portion, has its external diameter reduced, and if desired, its internal diameter increased, so as to give a thin-walled portion 16. The tubular gripping element is divided longitudinally by saw-cuts 17, which extend from the small end of the coned portion, (or the top in Fig. 1) nearly to the remote end of the thin-walled portion, so as to leave only a narrow ring 18 at the lower end holding the various parts together. Conveniently the saw-cuts 17 are four in number. Each of the gripping elements which are thus separated from one another, is therefore supported from the ring 18 by a strip 16 of the thin wall, and the dimensions of the parts are so chosen that these strips 16 are flexible. When the portions 14 of the gripping elements are moved inward to grip the wire in the usual manner, by screwing down the nut 11, the said strips 16 being sufficiently flexible, take a sigmoidal or S-shaped curvature whereby the gripping faces 15 are advanced inward while maintaining parallelism with their original cylindrical setting.

This construction, therefore, obviates the disadvantage hitherto existing in gripping devices of the type in which the various gripping elements are conical as to the whole of their length and are divided by saw cuts for the greater part of that length. Such a construction is not sufficiently flexible and the wedging action of the cone merely tilts the various gripping elements relatively to one another so that they only grip the rod or wire at one end of their gripping faces, that is to say, the free end where they are separated by the saw cuts.

Referring again to Fig. 1, in order to prevent rotation of the tubular gripping element with the nut 11, when the latter is being screwed up, or by the tendency of a stranded cable to untwist, a pin 19 is inserted in the body 10 so as to pass through two of the saw cuts 17. In addition to preventing the rotation of the tubular gripping member, this pin also retains it against being separated from the body 10, or falling out, should the nut 11 be taken off.

The formation of the thin walled portion as above-described, provides an external shoulder 20 at its junction with the conical portion 14, and this shoulder is conveniently used as a seating for a compression spring 21. The other end of this spring is seated upon the end 22 of the body 10 or in any other convenient location, and the spring is arranged to be normally in compression so that it tends to force the gripping elements toward the small end of the conical space wherein they are mounted, and thereby close them together. The reason for using the spring 21, is that if the element which is gripped is liable to become alternately tight and slack, the spring prevents the gripping elements from being slackened back in their conical seating and thereby releasing the grip on the wire, should the wire get slack.

The construction illustrated in Fig. 1, is used for connecting two wires, cables, or rods end to end, the ends of the two elements being inserted respectively into each end of the connector.

In order to provide for greater flexibility of the ring 18 and the thin-walled strips 16, additional saw cuts 23 may be provided, extending from the ring 18 toward the other end of the tubular gripping element, such cuts being interspaced with the saw cuts 17.

As above-mentioned, the construction of gripping devices constituting the present invention may be used in various ways. In Figs. 2 and 3 it is shown as applied to a device for securing stay-wires for poles, or the like. A body portion 30 is coned internally at 31 and a tubular gripping element 32, similar in all respects to that described with relation to Fig. 1 is inserted therein. The compression spring 33 is used in conjunction with it in the same manner, and this spring is conveniently seated upon a washer 34, which is sprung into a notch in the larger end of the conical aperture 31.

In such a construction as this, where the element which is gripped is always subject to tension, it is not necessary to provide for screwing or feeding the internally coned-member on to the gripping device, since the tension in the wire always draws the gripping device 32 toward the smaller end of the conical aperture wherein it is seated. The spring 33, however, is useful, since it operates to guard against accidental variations in such tension and to prevent the wire from being released. When it is desired to release the wire, it is necessary to pull the gripping element 32 downward, and this may be effected by providing suitable holes 35 or otherwise forming the projecting end of the thin walled portion so that a suitable tool can be applied to it to effect the desired endwise movement.

The body portion 30 is provided with a laterally-extending flange or plate 36, through which the two limbs of a shackle 37 pass, being secured therein by nuts 38 threaded upon the free ends.

Other forms in which the device are used are illustrated in Figs. 4 and 5. In Fig. 4, the body portion 40 is provided with a lug 41, suitable for electrical connection to another element, and the gripping device is mounted upon the other end of the body portion within the nut 42, the construction in this case being similar to the upper portion of the construction shown in Fig. 1.

In Fig. 5, the body portion 45 is formed with a tubular socket 46, adapted to receive a rodlike element 47, which is to be electrically connected to a cable, the cable being inserted within the gripping element, which is located in the nut 48.

These and other modifications embodying the improved construction of gripping element, as hereinbefore described, are all held to lie within the scope of the present invention; the principal advantages of the construction of gripping element hereinbefore described, are that good electrical contact is insured, without the necessity of sweating or brazing parts together, also the mechanical grip is effective notwithstanding any elongation and consequent reduction in the diameter of the wire, owing to the spring aforesaid automatically feeding the gripping devices forward; the mechanical grip is also maintained even under alternate pulls and slackening of the element which is gripped.

What I claim as my invention and desire to secure by Letters Patent is:—

1. In a wire-gripping device the combination of, a tubular member coned as to its internal surface, a plurality of gripping members located in said tubular member, movable relatively to it along its axis, and having internal gripping-surfaces and external conical surfaces, the latter engaging said coned internal surface on the tubular-member, and flexible means integral with and connecting together said gripping-members and permitting said gripping-surfaces always to remain parallel with their original setting while they are effecting their grip.

2. In a wire-gripping device the combination of, a tubular member coned as to its internal surface, a plurality of gripping members located in said tubular member, movable relatively to it along its axis, and having internal gripping-surfaces and external conical-surfaces, the latter engaging said coned internal surface on the tubular member, flexible means connecting together said gripping-members and permitting said gripping-surfaces always to remain parallel with their original setting while they are effecting their grip, and resilient controlling means pressing said gripping members toward the smaller end of the internally-coned tubular-member.

3. In a wire-gripping device the combination of, a tubular member coned as to its internal surface, a plurality of circularly-disposed gripping-members located in said tubular member, movable relatively to it along its axis, and having internal gripping-surfaces and external conical-surfaces engaging said coned internal surface on the tubular-member, a ring coaxial with said circularly-disposed gripping-members, and a plurality of strips connected to said ring, each flexible in the radial plane wherein it lies, and each connecting said ring to one of said gripping-members.

4. In a wire-gripping device, the combination, of a tubular-member coned as to its internal surface, a plurality of circularly-disposed gripping-members located in said tubular-member, movable relatively to it along its axis, and having internal gripping-surfaces and external conical surfaces engaging said coned internal-surface on the tubular member, a flexible ring coaxial with said circularly-disposed gripping members, and a plurality of strips connected to said ring, each flexible in the radial plane wherein it lies, and each connecting said ring to one of said members.

5. In a wire-gripping device the combination of, a tubular member coned as to its internal surface, a tubular gripping-element within said member, said element being conical externally at one end as to a portion of its length, and engaging said coned internal surface, and having the thickness of its wall reduced for the remainder of its length, and provided with longitudinal cuts extending from the said end through the conical portion to near the other end, and a spring pressing said tubular gripping-element toward the small end of said internally-coned member.

In testimony whereof I affix my signature.

GEORGE VICTOR TWISS.